J. H. DREW.
Cloth-Cutting Mechanisms.
No. 146,580.           Patented Jan. 20, 1874.
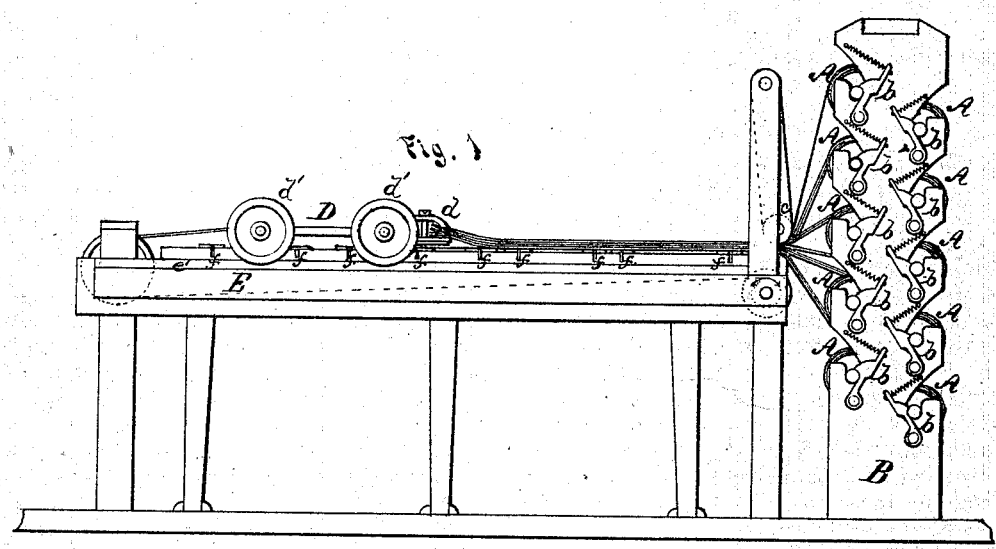
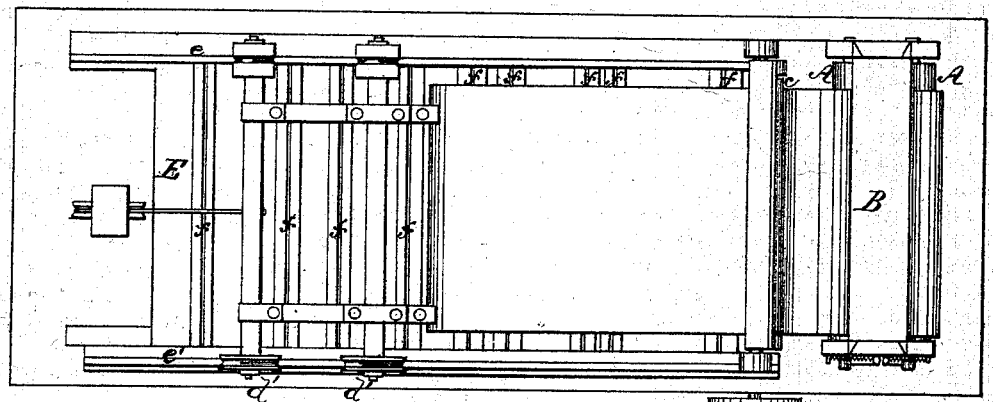
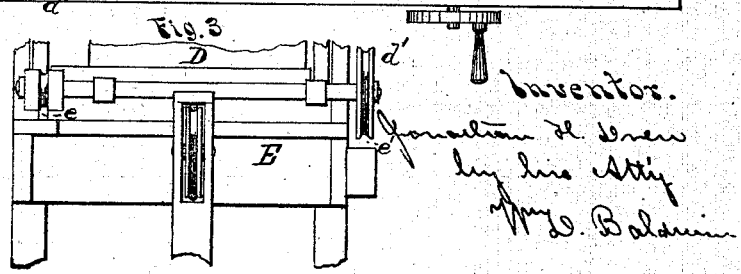

UNITED STATES PATENT OFFICE.

JONATHAN H. DREW, OF ST. LOUIS, MISSOURI.

IMPROVEMENT IN CLOTH-CUTTING MECHANISMS.

Specification forming part of Letters Patent No. 146,580, dated January 20, 1874; application filed August 1, 1873.

*To all whom it may concern:*

Be it known that I, JONATHAN H. DREW, of St. Louis, Missouri, have invented certain Improvements in Cloth-Cutting Mechanism, of which the following is a specification:

The object of my invention is simultaneously and accurately to cut several thicknesses of cloth into given uniform lengths. This desideratum I attain by winding the cloth upon separate rolls, placing them in a frame under tension, attaching them to a traveling clamp, by which they are smoothly stretched over a table divided by transverse grooves, and then severing the cloths by a knife working in the grooves of the table.

The subject-matter claimed is hereinafter specified.

The accompanying drawings show so much of a machine in which all my improvements are embodied as is necessary to illustrate the subject-matter herein claimed—

Figure 1 being a side elevation, Fig. 2 a plan, and Fig. 3 an end view, thereof.

The cloths to be cut are wound upon rolls A, turning in open slotted bearings in a frame, B, a proper tension being preserved upon them by means of overlapping spring-hooks $b$. The construction above described allows the rolls readily to be removed or replaced. The cloths from the several rolls pass under a suitable tension-roller, $c$, and are secured in a clamp, $d$, mounted on a traveling carriage, D. The carriage D runs on rails $e\ e'$ on a table, E, and is moved by a rope and windlass, a rack and pinion, or other well-known equivalents. The table is divided into spaces of any desired length by means of transverse grooves, $f$, cut in its upper surface, the cloths being severed by a knife, actuated either automatically or by hand, traversing in these slots, the cloth while being cut being held down by clamps. (Not shown in the drawings.)

In practice, that portion of the table between the rollers and a point about half an inch from the first groove is made as high as the level of the nippers. A clamp-bar let down upon the cloth while being cut rests upon this raised portion. The severed end of the cloth next the rollers is clamped between this bar and the raised part of the table, in such manner that it projects beyond them in a position to be readily seized by the nippers on their next advance. The retrograde movement of the traveling clamp-carriage is automatically stopped by means of removable pins inserted in the table.

One side rail, $e'$, on which the carriage runs, is sunk below the bottom of the grooves, in order to avoid dulling the edge of the knife, and to compensate this depression the wheels $d'$ of the carriage on that side are made correspondingly larger, thus keeping the axles of the carriage parallel with the table.

The utility of this mechanism has been amply demonstrated practically.

I claim as my invention—

1. The combination, substantially as set forth, of a cutting-table having a depressed rail on one side, and a traveling clamp-carriage having wheels of unequal diameters, to compensate the inequality of the rails.

2. The combination, substantially as set forth, of a cutting-table, a traveling clamping-carriage, and a series of tension-rollers, from which the cloth to be cut is unwound.

In testimony whereof I have hereunto subscribed my name.

JONATHAN H. DREW.

Witnesses:
  C. H. CHAPIN,
  T. W. BLACKMAN.